Aug. 2, 1960 H. A. GORMAN 2,947,308

HIP JOINT PROSTHESIS

Filed Nov. 2, 1956 2 Sheets-Sheet 1

INVENTOR.
HARRY A. GORMAN
BY
[signature]
ATTORNEY

Aug. 2, 1960 H. A. GORMAN 2,947,308

HIP JOINT PROSTHESIS

Filed Nov. 2, 1956 2 Sheets-Sheet 2

INVENTOR.
HARRY A. GORMAN
BY
[signature]
ATTORNEY 2,947,308

HIP JOINT PROSTHESIS

Harry A. Gorman, San Antonio, Tex.
(26 Outer Octagon, Randolph AFB, Tex.)

Filed Nov. 2, 1956, Ser. No. 620,139

3 Claims. (Cl. 128—92)

The present invention deals with a prosthetic hip joint and more particularly with a complete prosthetic hip joint as a means of restoring the function of the coxofemoral joint when the natural joint has become defective or damaged sufficiently to require prosthesis.

Both cup arthroplasty and femoral head prostheses are used by orthopedic surgeons in order to rehabilitate hip joints incapacitated by disease or injury.

With the cup type prosthesis, the head of the femur and acetabulum are reconstructed for the interposition of a polished cup between the surfaces of the reconstructed bone. The cup prosthesis articulates with the acetabulum as well as the cancellous bone of the femoral head, and postoperative reaction of the subject indicates pain due to the sensitive cancellous bone during articulation.

With the femoral head prostheses, the head of the femur is reconstructed and fitted with a prosthetic head for articulation with the acetabulum. Orthopedic surgeons have depended upon the pull of the gluteal muscles and the assistance of the joint capsule to retain the prosthetic femoral head within the acetabulum. However, it has been determined that postoperative function of the joint often results in dislocation of the joint and other complications due to the inadequacy of joint strength in the absence of the natural anchorage of the round ligament, and whereby dependency on the gluteal muscles to maintain retention of the femoral head within the acetabulum is often insufficient even with an extended period of rest and inactivity to enable some fixation by natural process.

Even with the combination of a prosthetic femur head articulating with a prosthetic cup, the disadvantages above set forth are not substantially avoided.

Consequently, none of the joint prostheses heretofore known have been found to meet all the desirable requirements of a substitute hip joint.

It is an object of the present invention to provide a complete prosthetic hip joint. It is a further object of the present invention to provide a complete prosthetic hip joint whereby articulation is confined to surfaces of the prosthetic joint itself. It is a further object of the present invention to provide a complete prosthetic hip joint including novel anchorage means therefor. It is a still further object of the present invention to provide a complete prosthetic hip joint whereby dislocation of the joint is prevented and whereby other disadvantages of artificial hip joints as heretofore known are avoided. Other objects and advantages of this invention will become apparent from the description hereinafter following and the drawings forming a part hereof, wherein:

Figures 3, 4, 5, 6, 7, 8:
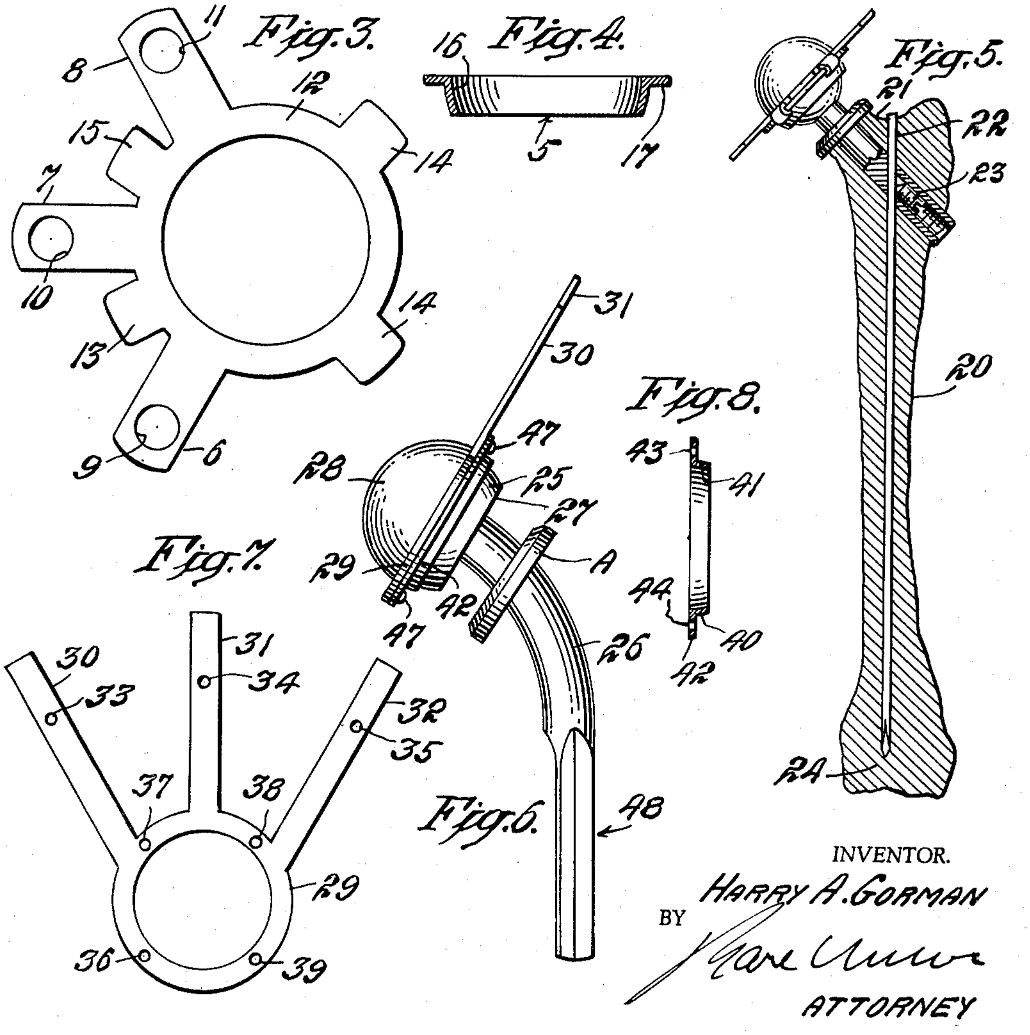
Figure 3 illustrates a lay-out view of an embodiment of Figure 1.
Figure 4 illustrates a cross-sectional view of another embodiment of Figure 1.
Figures 9, 10, 11, 12, 13:
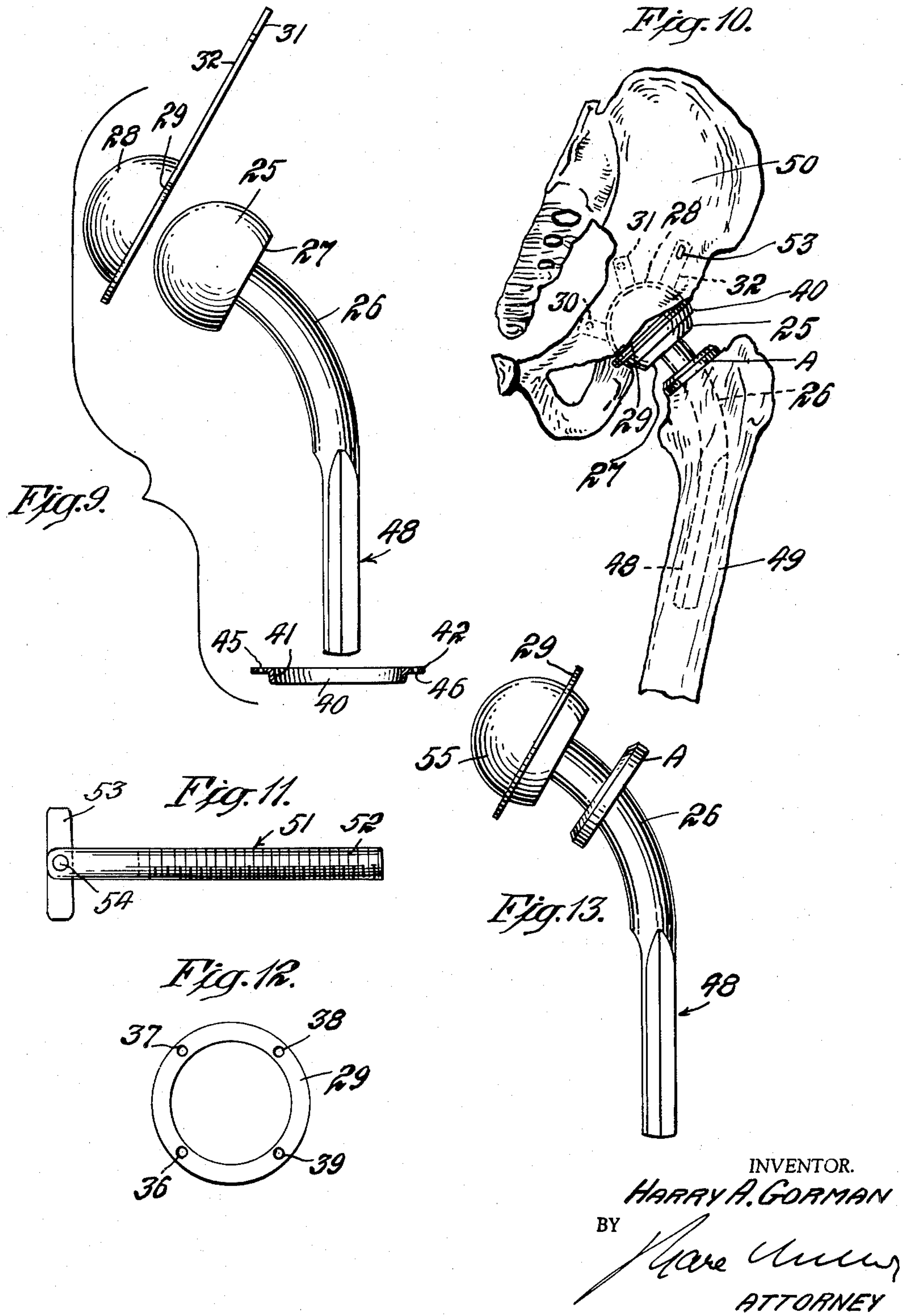

Figure 5 illustrates a partly elevation and partly cross-sectional view of the hip joint as applied to the femur, Figure 6 illustrates a modified form of prosthetic hip joint according to the invention, Figure 7 illustrates a lay-out view of an embodiment of Figure 6, Figure 8 illustrates a cross-sectional view of another embodiment of Figure 6, Figure 9 illustrates a disassembled view of Figure 6, Figure 10 illustrates the prosthetic hip join of Figure 6 as applied to the pelvis and the femur, Figure 11 illustrates a securing means employed with the prosthesis, Figure 12 illustrates a modification of Figure 7, and Figure 13 illustrates still another modification of the invention.

According to the invention there is provided a complete prosthetic hip joint of the ball and socket type, which is self-contained as a complete prosthetic hip joint, which articulates only in contact with prosthetic surfaces, which is adapted to prevent dislocation of the joint, and which otherwise avoids the disadvantages of prosthetic hip joints heretofore known. The joint itself is adapted for anchorage to the femur by means of a combination of cortical bone fixation and intramedullary anchorage or by means of intramedullary anchorage alone.

Figures 1, 2:
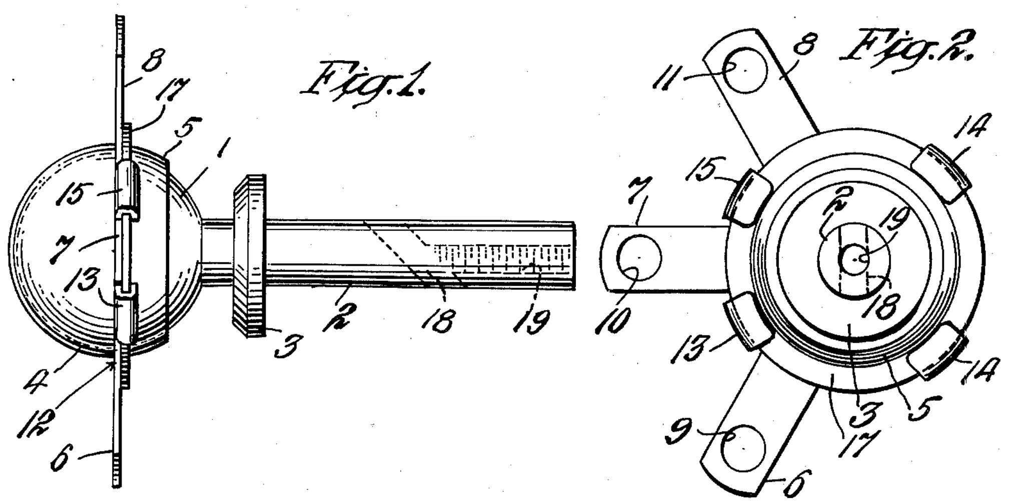
Figure 1 illustrates an elevational side view of a complete hip joint.
Figure 2 illustrates an end view of Figure 1.

Figure 1 illustrates an elevational side view of a complete prosthetic hip joint of the ball and socket type comprising a substantially spherical ball 1 having a stem 2 either integrally or otherwise secured thereto and with a collar 3 on said stem either spaced from or contacting said ball. A cup member 4, preferably of hemispherical shape, is positioned over the ball 1 in slidable or articulate contact with said ball. A flanged ring 5, having a substantially spherical inner surface, is positioned in abutment with the rim of said cup 4 and mechanically connected thereto, said combination of cup and ring having an articulate surface of at least and preferably more than 50 percent of said ball surface, whereby said ball is mechanically retained within the said cup.

Figures 2, 3, and 4 illustrate a manner of mechanically securing the ring 5 in abutment with the rim of said cup 4. The cup 4, according to Figures 1 and 3 is provided with a cup-like body having arms 6, 7, and 8 apertured at the ends thereof with apertures 9, 10, and 11, said arms extending outwardly of the rim or flange 12 of said cup 4. Also extending outwardly of said rim 12, are short tabs 13, 14, and 15. The ring 5 of Figure 4 is positioned on the ball 1 with an inner spherical surface 16 contacting said ball and with a rim or flange 17 thereof abutting the rim 12 of said cup. In this position, the tabs 13, 14, and 15 are bent over rim 17 of the ring 5 thereby mechanically connecting said cup 4 and said ring 5. However, an equivalent connection may be provided by providing the tabs on the collar instead of on said cup, or said tabs may be completely dispensed with as shown by Figure 12.

According to Figure 1, the stem 2 is provided with a slanted bore 18 therethrough passing through to the axis of said stem and with a threaded passage 19 coaxially of said stem and communicating with the bore 18.

Figure 5 illustrates the application of the prosthetic hip joint to the femur 20. The head of the femur having been removed, a hole is drilled at approximately a 45° angle to the vertical axis of the femur through the neck and the lateral cortex of the femur. The stem 2 of the prosthesis is driven through the angular hole with the collar 3 abutting the cortical bone of the severed neck 21. Having thus positioned the prosthesis, a medullary pin 22 is drilled through the cortical bone on the dorsum of the femoral neck, passing through the hole 18 of the prosthetic stem and continued into the medullary canal to the cortical bone at the distal end 24 of the medullary canal of the femur. In order to secure the medullary pin in its fixation position, a locking screw 23 is screwed into the threaded passage 19 into mechanical contact with the medullary pin 22 in the bore 18.

In lieu of the prosthetic joint illustrated by Figures 1–5 of the drawings, the invention applies to the modifications illustrated by Figures 6–10.

Figures 6–13 illustrate a complete modified prosthetic hip joint comprising a substantially spherical ball 25 having an arcuate stem 26 integrally or mechanically secured thereto. While the ball 25 is shown as having a shoulder or flat face 27 facing the stem 26, such shoulder 27 is supplemented by the provision of an equivalent collar A on the stem 26 spaced from the ball 25 as described with respect to collar 3 of Figure 1. The cup member 28, preferably of hemispherical shape, is positioned over the ball 25 in slidable articulate contact therewith. The cup 28, is provided with a flanged rim 29 and arms 30, 31, and 32 extending outwardly of the rim, said arms having apertures 33, 34 and 35 substantially through the end portions thereof and said rim 29 being provided with a plurality of orifices 36, 37, 38 and 39. A flanged ring 40 having a substantially spherical inner surface 41 and flange 42, with apertures 43, 44, 45 and 46 through said flange, is positioned on said ball 25 with the flange 42 abutting the rim 29 and cup rim apertures 36, 37, 38 and 39 aligned with ring flange apertures 43, 44, 45 and 46. The ring 40 is secured to the cup 28, for example, by means of welding rivets or screws 47 passing through the cup and collar apertures. The combination of cup and ring as illustrated by Figures 6 and 9 preferably have an articulating surface of more than 50 percent of the ball surface.

The arcuate stem is so curved that when the collar A of stem abuts the cortical bone of the severed femoral neck, the stem is directed through the bone of the neck and then curves into and coaxial with the medullary canal. In order to facilitate application of the prosthesis and to provide suitable fixation, the free end 48 is channelled and provided with a sharp edge such, for example, as known from the Smith-Peterson type of medullary nails.

Figure 13 shows a modification of Figures 1 and 6 in that the combination of cup and ring may be substituted by a single cup 55 having an articulating inner surface of more than 50 percent of the ball surface.

Figure 10 illustrates the application of the prosthetic hip joint to the femur 49 and pelvis 50.

In order to secure the prosthetic cup 4 or 28 into the acetabular cavity of the pelvis, the acetabular cavity may be reconstructed by means of the trephine and burr for proper fitting of the cup into the acetabulum in the event that such acetabular cavity is filled or otherwise inhibitive to fitting because of connective tissue and osseous deposits. However, in the case of a substantially normal acetabular condition, none or a minimum of reconstruction may be resorted to depending upon the fit of the cup.

Having reduced the prosthetic cup into the acetabulum, there is the provision of means to prevent possible future dislocation of the joint which must be considered if the fitting of the cup in the acetabular cavity is not of sufficient anchorage. While the fact that the cup-collar combination, which covers at least 50 percent of the ball surface, provides adequate protection from separation of cup and ball, there is the consideration of separation of the cup from the acetabulum in certain cases, such as for dogs, but not necessary for the human pelvis. To this end, the cup arms 8, 9, and 10 or cup arms 31, 32 and 33 are positioned against the pelvic bone surrounding the acetabular cavity and fixed to the pelvis as shown by Figure 10 and preferably by means, for example, of a toggle bolt 51 illustrated by Figure 11, comprising a threaded shank 52 and a rectangular movable head 53 rotational about an axis 54 perpendicular to the shaft axis and located on an end portion of said shank.

By means of the toggle bolt 51, the head of said bolt may be rotated in alignment with the shaft axis and inserted dorsally through the body of the illium through holes provided therefor, and manipulated so that the head 53 lays against the inner bone surface of the illium surrounding the hole through which the head has been previously inserted. Having so secured each of the said cup arms by means of toggle bolts through the operations of the cup arms and illium apertures, a nut member (not shown) is applied to the threaded shaft 52 and whereby the cup 4 or 28 is secured within the acetabulum.

While the illustrations are specific structures, it is not intended that the invention be limited thereto, but that the teaching herein set forth be construed within the scope of the appended claims.

What is claimed is:

1. A hip-joint prosthesis comprising a shaft, a ball member on one end of said shaft, a cup member capping said ball member, a ring member having an inner substantially spherical surface, said ring member abutting the rim of said cup member, said ball member being articulate within said cup and ring members, a collar on said shaft spaced from said ball member, the shaft having a slanted hole passing through the axis thereof, and a coaxial bore through one end of said shaft communicating with said hole.

2. A hip-joint prosthesis according to claim 1, comprising a securing means passing through said hole.

3. A hip-joint prosthesis comprising a shaft, a ball member on one end of said shaft, a cup member capping said ball member, a flange extending from and radially outwardly of the rim of said cup member, a ring member having an inner substantially spherical surface, a flange extending from and radially outwardly of the rim of said ring member, the cup and ring flanges being substantially coextensive and abutting each other, and securing means combining the extended portions of said cup and ring flanges to each other, said securing means passing through said combined flanges.

References Cited in the file of this patent

UNITED STATES PATENTS

| | | |
|---|---|---|
| 2,668,531 | Haboush | Feb. 9, 1954 |
| 2,765,787 | Pellet | Oct. 9, 1956 |

FOREIGN PATENTS

| | | |
|---|---|---|
| 1,047,640 | France | July 22, 1953 |
| 757,951 | Germany | Nov. 9, 1953 |
| 876,739 | Germany | May 18, 1953 |

OTHER REFERENCES

Journal of Bone & Joint Surgery for July 1951, advertising page 4. (Copy in Science Library.)